MAGNETIC TAPE TRANSPORT USING RADIATION SENSITIVE MEANS TO SIGNAL BUFFER STORAGE ARM POSITION

Filed July 17, 1967

INVENTOR.
RICHARD TOBEY

BY
FOWLER, KNOBBE
& MARTENS
ATTORNEYS.

INVENTOR
RICHARD TOBEY
BY
FOWLER, KNOBBE
& MARTENS
ATTORNEYS.

INVENTOR.
RICHARD TOBEY
BY
FOWLER, KNOBBE & MARTENS
ATTORNEYS.

INVENTOR
RICHARD TOBEY
BY
FOWLER, KNOBBE
& MARTENS
ATTORNEYS.

INVENTOR.
RICHARD TOBEY
BY
FOWLER, KNOBBE
& MARTENS
ATTORNEYS.

INVENTOR.
RICHARD TOBEY
BY
FOWLER, KNOBBE
& MARTENS
ATTORNEYS.

3,470,382

MAGNETIC TAPE TRANSPORT USING RADIATION SENSITIVE MEANS TO SIGNAL BUFFER STORAGE ARM POSITION

Richard Tobey, Tustin, Calif., assignor to Dartex Division of Tally Corporation, Santa Ana, Calif., a corporation of California Filed July 17, 1967, Ser. No. 653,820
Int. Cl. G01n 21/30
U.S. Cl. 250—219 32 Claims

ABSTRACT OF THE DISCLOSURE

A magnetic tape transport wherein a continuous signal corresponding to buffer storage arm position is produced by the combination of a light source carried by the buffer arm and a pair of photosensitive devices mounted on opposite sides of the buffer arm. Another signal, corresponding to movement of the buffer arm to a predetermined limit position, is produced by the combination of the light source and an additional photosensitive device exposed to the light energy in all positions of the arm except at the predetermined limit position.

BACKGROUND OF THE INVENTION

Field of the invention

This invention relates to improvements in magnetic tape transports, and particularly, to transports for recording digital data.

DESCRIPTION OF THE PRIOR ART

Magnetic tape transports are commonly utilized for recording digitally encoded data. Such machines are characterized by rapid acceleration and deceleration of the tape in both forward and reverse directions. These rapid accelerations require that the mass of the tape on the file and tape take-up means be isolated from the rapid starting and stopping of the tape drive. A sophisticated form of isolation comprises vacuum storage columns which store a sufficient length of tape to accommodate the maximum accelerations produced by the tape drive. However, such units are expensive and also require a fairly substantial physical space. As a result, they are not compatible with low cost, compact digital tape recorders.

Another form of a buffer storage which is employed is a buffer storage arm associated with the file and take-up means, respectively. The arm supports a rotary tape guide in contact with the magnetic tape and movement of the arm accommodates acceleration and deceleration of the tape in both directions.

In one prior art embodiment, the buffer arm is controlled by a non-linear "bang-bang" servo in which a pair of switches detect movement of the arm between two limits. During operation, the buffer arm oscillates between the two limit positions. One disadvantage of this approach is that the buffer storage cannot be utilized for high tape speeds, e.g., 100 or more inches of tape per second. Another disadvantage is that the mechanical switches impose reliability limitations. In another prior art embodiment, the buffer arm position is monitored by a potentiometer having its input shaft coupled to rotate in accordance with rotation of the buffer arm. This approach has several practical and formidable limitations, however, including: (i) potentiometer noise—which increases with potentiometer wear; (ii) resolution problems and the need to withstand high usage in a small area of the resistance element; since the potentiometer must operate over a very small angle of travel, (iii) undesirable friction torque on the arm and (iv) relatively high unit cost of a precision potentiometer.

This latter approach therefore also suffers from reliability considerations and is also fairly expensive, particularly when a precision potentiometer is used in an attempt to minimize the noise and wear problems inherent in a potentiometer. Moreover, the noise generated by a potentiometer makes it impractical to employ the high degree of phase-lead compensation needed for a critically damped servo system; therefore, such systems have generally been subject to overshoot of the buffer arm followed by one or more oscillations each time the buffer arm is moved upon acceleration or deceleration of the tape.

Another problem associated with contemporary buffer arm storage systems is providing a suitable means for halting machine operation if the tape exceeds a given storage position. For example, if more tape is fed onto the buffer storage arm than the buffer arm can accommodate, the tape is prone to becoming entangled within the machine with obvious deleterious results. It is therefore desirable to provide a transducer for detecting this condition by detecting whenever the buffer arm reaches a predetermined extreme position. The conventional means for detecting the limit of the buffer arm is to open and close mechanical switch contacts. However, this technique, while simple in concept, has several limitations. Thus, it requires a force from the buffer arm to actuate the switch, which force inherently detracts from the arm force which determines tape tension. Therefore, the tape tension will decrease before a loop fault is indicated. In servo systems wherein low tape tension and light forces are involved, this is a very serious limitation. Also, the mechanical contacts of the switch are subject to wear with consequent adjustment and reliability problems.

SUMMARY OF THE INVENTION

The present invention provides a reel servo system and the combination of a buffer arm, a radiant energy source carried by the buffer arm, and radiant energy sensitive means suitably positoned relative to the light source for providing a first electrical output signal indicative of the position of the arm and a second electrical signal corresponding to movement of the arm beyond a certain predetermined position.

In the preferred embodiment of the present invention, a pair of photoresponsive devices are fixedly attached to the tape deck proximate the path of movement of a lamp carried on the buffer arm. These devices are electrically connected to provide an output signal corresponding to the difference between the respective output electrical characteristics of the devices. Thus, as the buffer arm moves, it causes the light source to impinge more energy on one of the photoresponsive devices than the other so as to provide an output signal whose magnitude corresponds to the angular displacement of the buffer arm from a predetermined position and a polarity corresponding to the direction of displacement. Another photoresponsive device is physically carried on the arm so as to continuously receive light energy from the light source carried on the arm except when the arm swings to a predetermined extreme position in which event a cooperating shield attached to the tape deck is interposed between the lamp and photoresponsive device. The resultant change in electrical characteristics of the photoresponsive device is detected to accomplish the desired shut-down of the machine.

One advantage of this invention is that it provides a highly reliable buffer storage system at a relatively low cost. No mechanical wearing parts are involved nor are there any component ageing or wearing characteristics which give rise to reliability problems.

Another significant feature of this invention is that the output signal corresponding to a position of the buffer arm has a high gain and substantially no noise, thus being compatible with a substantial amount of rate feedback for providing a critically damped system. Accordingly, systems constructed in accordance with this invention provide a rapid return of the buffer arm to a predetermined position without overshoot or oscillation. The high signal strength permits a reduction in circuit complexity and substantially reduces susceptibility to electrical noise pickup.

A further feature of the invention is that no forces are exerted on the buffer arm by the position sensing and limit sensing means, thereby avoiding frictional forces and also the mechanical wear problems associated with mechanical connections with the buffer arm.

The present invention further lends itself to a fail safe arrangement in combination with the means for detecting tape position. These latter sensors typically employ a lamp focused on the tape and a photoresponsive device positioned so as to respond to light reflected from a reflective tab physically attached to the magnetic tape. A fail safe operation is achieved by connecting the lamps of the tape position sensors in series with the lamp carried on the buffer arm. Accordingly, a failure of the tape position lamp will interrupt current to the buffer arm carried lamp and be detected by the limit sensor in the same manner as if the illumination were cut off when the buffer arm reaches its extreme limit position. Burn out of the buffer arm carried lamp is similarly detected. Accordingly, any lamp failure will be immediately detected as a fault condition resulting in an orderly shut-down of the tape transport apparatus.

Figure 4:
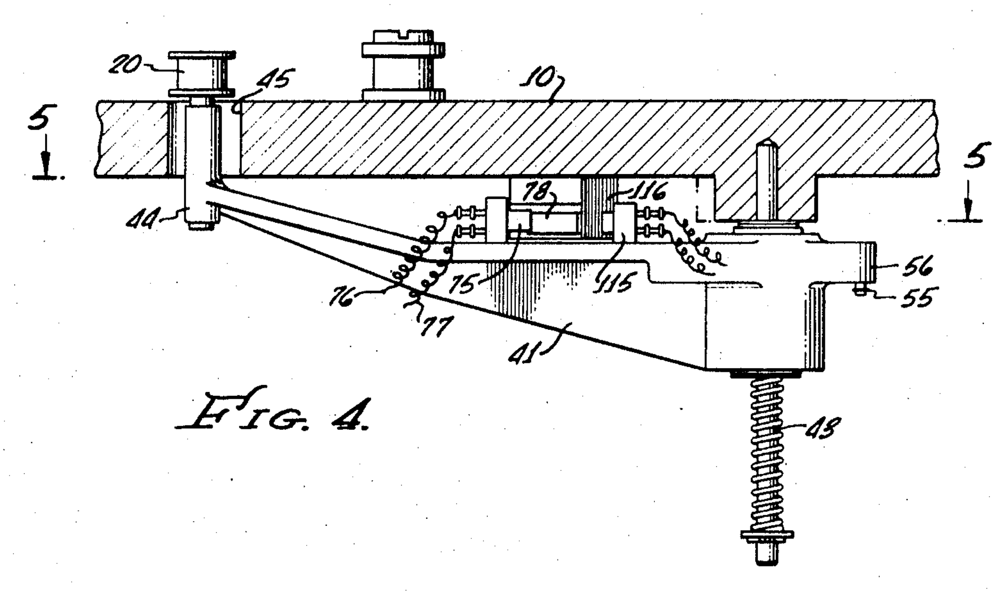
FIG. 4 is a sectional elevation of the buffer arm assembly taken along lines 4—4 of FIG. 2.
Figure 6:
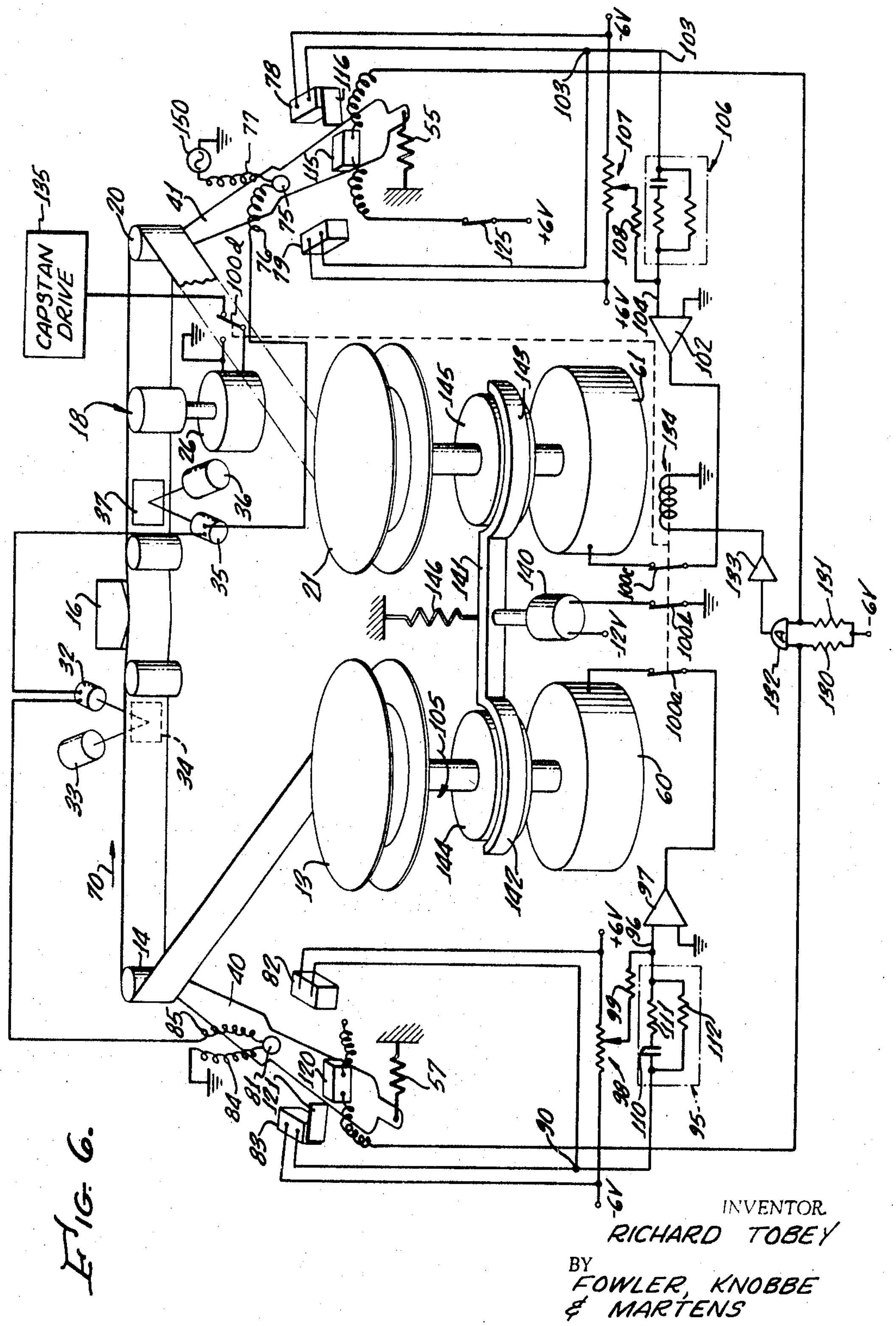
Figure 7:
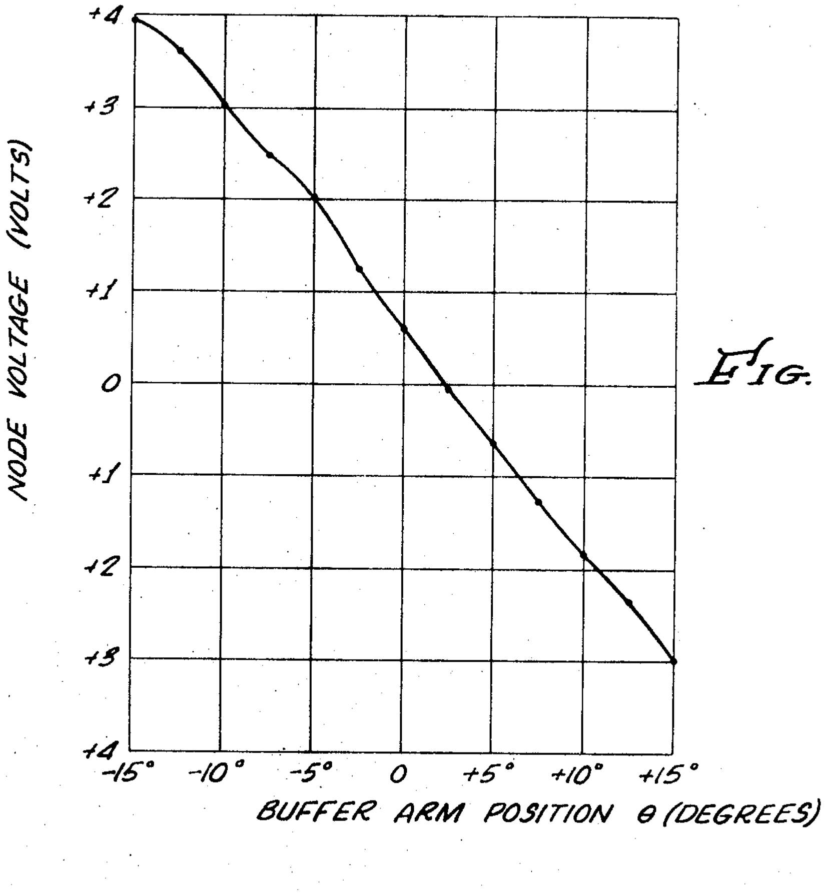
Figures 8, 9:
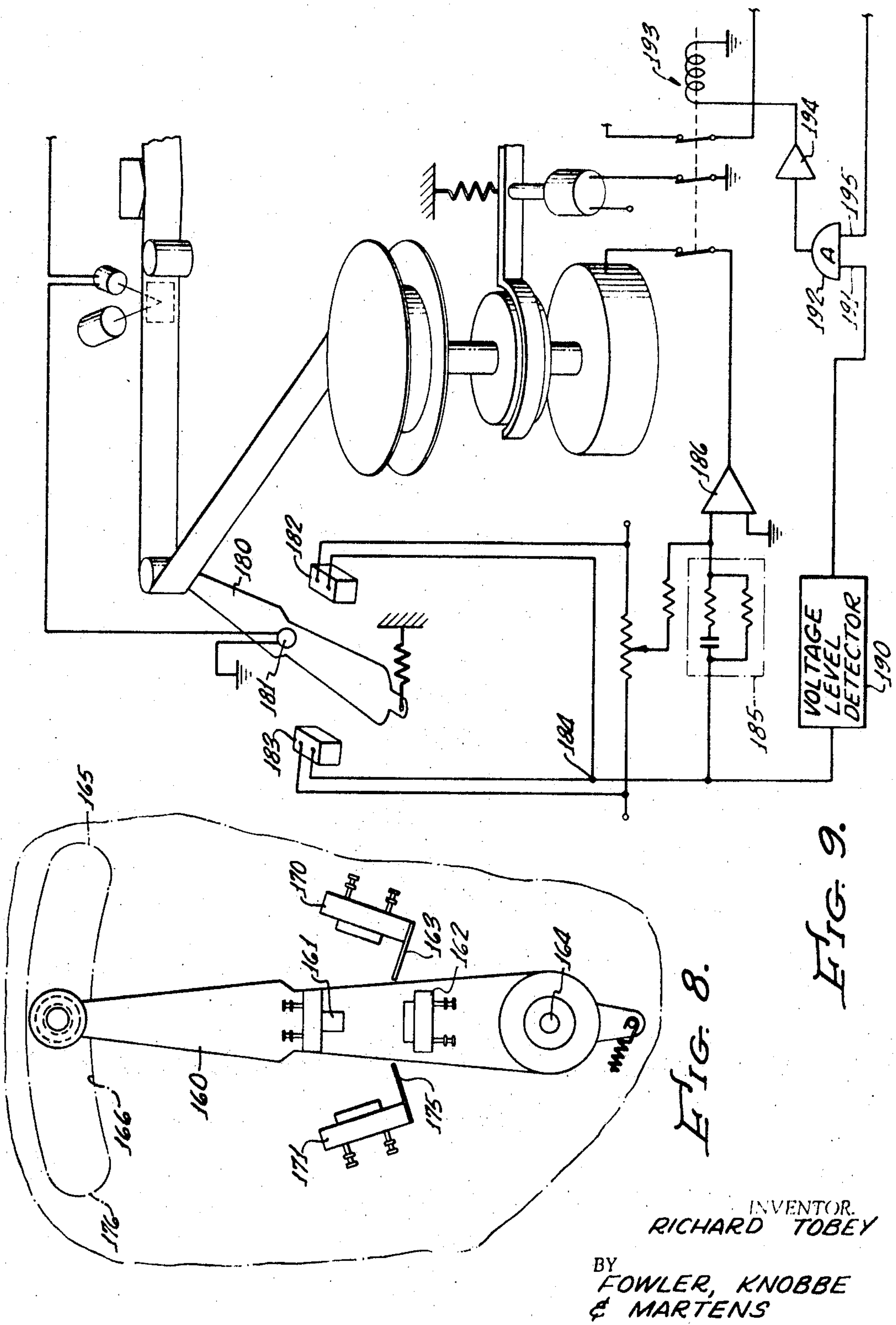

FIG. *5a* is an exterior elevation of the buffer arm assembly, generally along lines 5—5 of FIG. 4 showing the arm in its predetermined null position;

FIG. *5b* is an exterior elevation of the buffer arm assembly, generally along line 5—5 of FIG. 4 showing the arm in its extreme outer position;

FIG. 6 is an electrical schematic and diagrammatic perspective view illustrating the reel servos and limit position means;

FIG. 7 is a graph in which the output voltage derived from the differential connection between the photoresponsive devices varies in accordance with arm position;

FIG. 8 is a fragmentary elevation view of a buffer arm assembly having a limit position means responsive to arm movement both toward and away from the reel by a predetermined amount; and FIG. 9 is an electrical schematic and diagrammatic perspective view illustrating another embodiment of the reel servo and limit position means.

DESCRIPTION OF THE PREFERRED EMBODIMENT

Figure 1:
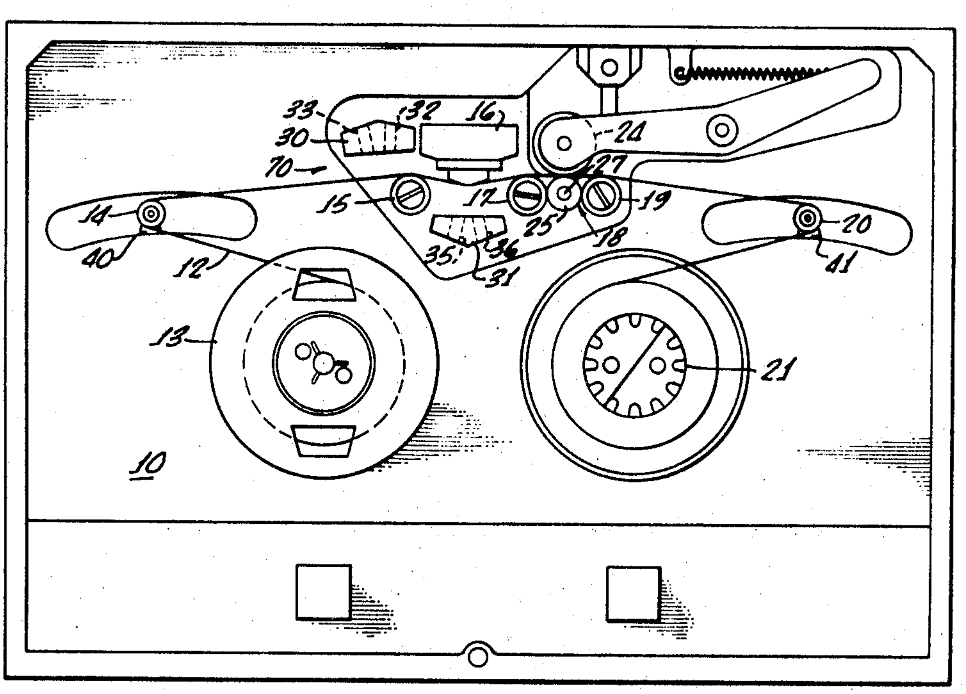
FIG. 1 is a front elevation view of the tape deck of a digital tape transport constructed in accordance with the preferred embodiment of this invention and showing the guide panel removed.
Figure 2:
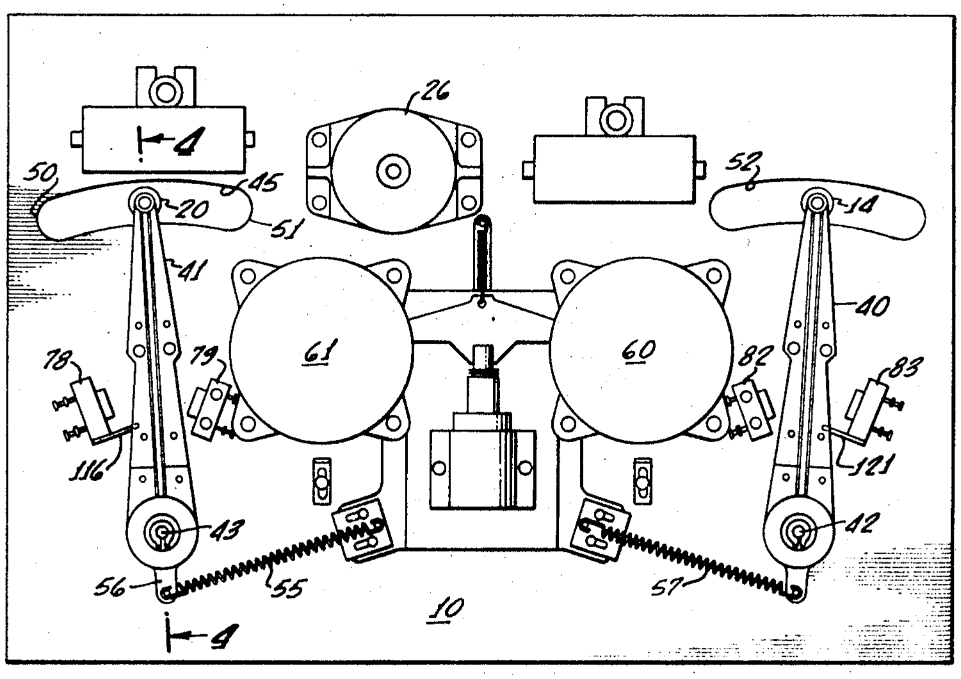
FIG. 2 is a rear elevation view of the tape deck of a digital tape transport constructed in accordance with the preferred embodiment of this invention.

Referring now to FIGS. 1 and 2, there is shown the front and rear sides, respectively, of the tape deck 10 of a digital tape transport embodying the present invention. The magnetic tape 12 wound on the supply or file reel 13 traverses a path defined by buffer roller 14, guide 15, read-write head 16, guide 17, capstan assembly 18, guide 19, buffer roller 20 and the take-up hub 21.

The capstan assembly 18 controls the movement of the tape in both directions past the head 16 for enabling data transfer to and from the tape. Advantageously, the capstan assembly is constructed as disclosed and claimed in the co-pending U.S. patent application, Ser. No. 476,286, entitled Tape Transport, filed on Aug. 2, 1965, by Robert A. Kleist and assigned to Dartex, Inc. In this assembly, the pressure roller 24 bears against the capstan 25 at all times except when tape is to be loaded or unloaded from the transport. Acceleration and deceleration of the tape in either direction is accomplished by bidirectionally accelerating or decelerating a motor 26 (FIG. 2) having a shaft 27 on which is fixedly mounted the capstan 25.

Figure 3:
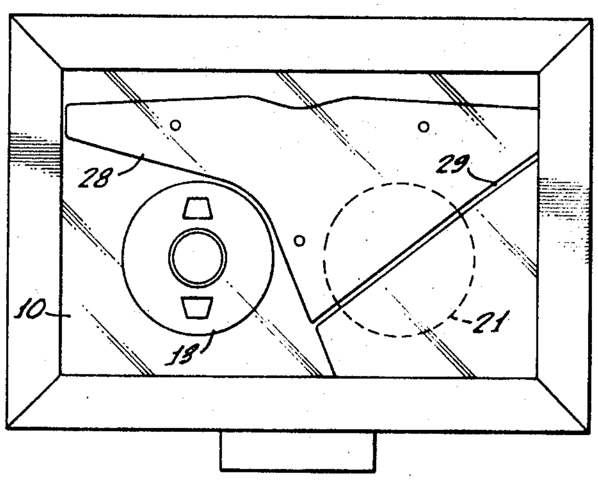
FIG. 3 is a front elevation view of the tape recorder of FIG. 1 with the guide panel in place.

While the details of the take-up hub and tape loading assembly form no part of the present invention, these mechanisms are preferably constructed in accordance with the co-pending U.S. patent application Ser. No. 504,344, now Patent No. 3,403,867, entitled Tape Transport, filed on Oct. 24, 1965, by Robert A. Kleist and assigned to Dartex, Inc., and which is illustrated in part in FIG. 3 hereof. As shown therein, a guide panel 28 covers a portion of the tape deck 10 and includes guide slot 29 for automatically loading the tape onto the take-up hub 21 by merely dropping the end of the tape 12 into the guide slot.

As shown in FIGS. 1 and 6, the magnetic tape travel is parallel to a first sensor 30 and a second sensor 31. The first sensor includes a light source 32, preferably a miniature incandescent lamp having a lens mounted at the end thereof for focusing the light upon the side of the tape containing the magnetic oxide recording layer. Light reflected from the tape is detected by a photosensitive transducer 33. The light intensity of bulb 32 and the photoresponse characteristic of the transducer 33 are selected so that insufficient light is reflected from the oxide surface to register a position indication. However, physically suported on the oxide side of the tape is a reflective tab 34 located at the physical end of the tape so that an electrical response indication is provided by transducer 33 at such time as this tab is proximate the position sensor 30.

The second sensor 31 also includes a similar light source 35 and photosensitive transducer 36 designed to be non-responsive to light reflected from the base material of the tape, e.g. Mylar. Advantageously, one or more light reflective tabs 37, one typically positioned near the beginning of the tape and another positioned near the end of the tape, provide a substantially increased amount of light reflected to the transducer 36 when proximate the sensor as shown in FIG. 6 for providing a position indication response. Typically, these response signals are used for defining the areas of useful recording on the magnetic tape.

Both the file and the take-up means are controlled by a reel servo system to accommodate rapid starts and stops of the tape. This system includes buffer arms 40 and 41 rotatably mounted to the rear side of the tape deck 10 on respective pivot axes 42 and 43, as shown in FIGS. 2 and 4. Each arm includes an integral journal bearing at its outer end extending parallel to the pivot axis through an arcuate slot formed in the tape deck 10, e.g. bearing 44 integral with arm 41 and extending through arcuate slot 45 and rotatably mounting buffer roller 20. Slot 45 defines the limits of travel of the buffer arm 41 between an extreme outer limit position 50 and an extreme inner limit position 51. In like manner, slot 52 defines the outer and inner limits of travel of buffer arm 40.

Tape tension is determined by the force exerted by a tension spring biasing the buffer arm toward its outer limit position. As shown in FIG. 2, tension spring 55 has one end affixed to the tape deck 10 and the other end connected to a tong 56 extending away from the pivot axis 42 in a direction opposite to the roller 20. In like manner, tension is applied to arm 40 by tension spring 57. The reel servo system applies a suitable torque to the file reel 13 via its drive motor 60 and take-up hub 21 via its drive motor 61 to counterbalance the tension of the respective tension springs to maintain each of the buffer arms between the extreme outer and inner travel limits in a predetermined null position, as shown in FIGS. 1, 2, 5*a* and 6.

The reel servo system effectively isolates the file and take-up means from the capstan drive so that rapid starts and stops of the tape are accommodated by rotation of the buffer arms 40 and 41 on their respective pivot axes. For example, if the capstan accelerates the tape in the direction of arrow 70 (FIG. 1), buffer arm 40 will momentarily rotate toward its inner limit and buffer arm 41 will momentarily rotate toward its outer limit. These respective movements of the buffer arms are detected, causing a reduced torque to be applied to file reel motor 60 and an increased torque to take-up hub motor 61 to return the buffer arms to their respective null positions.

Figures 5A, 5B:
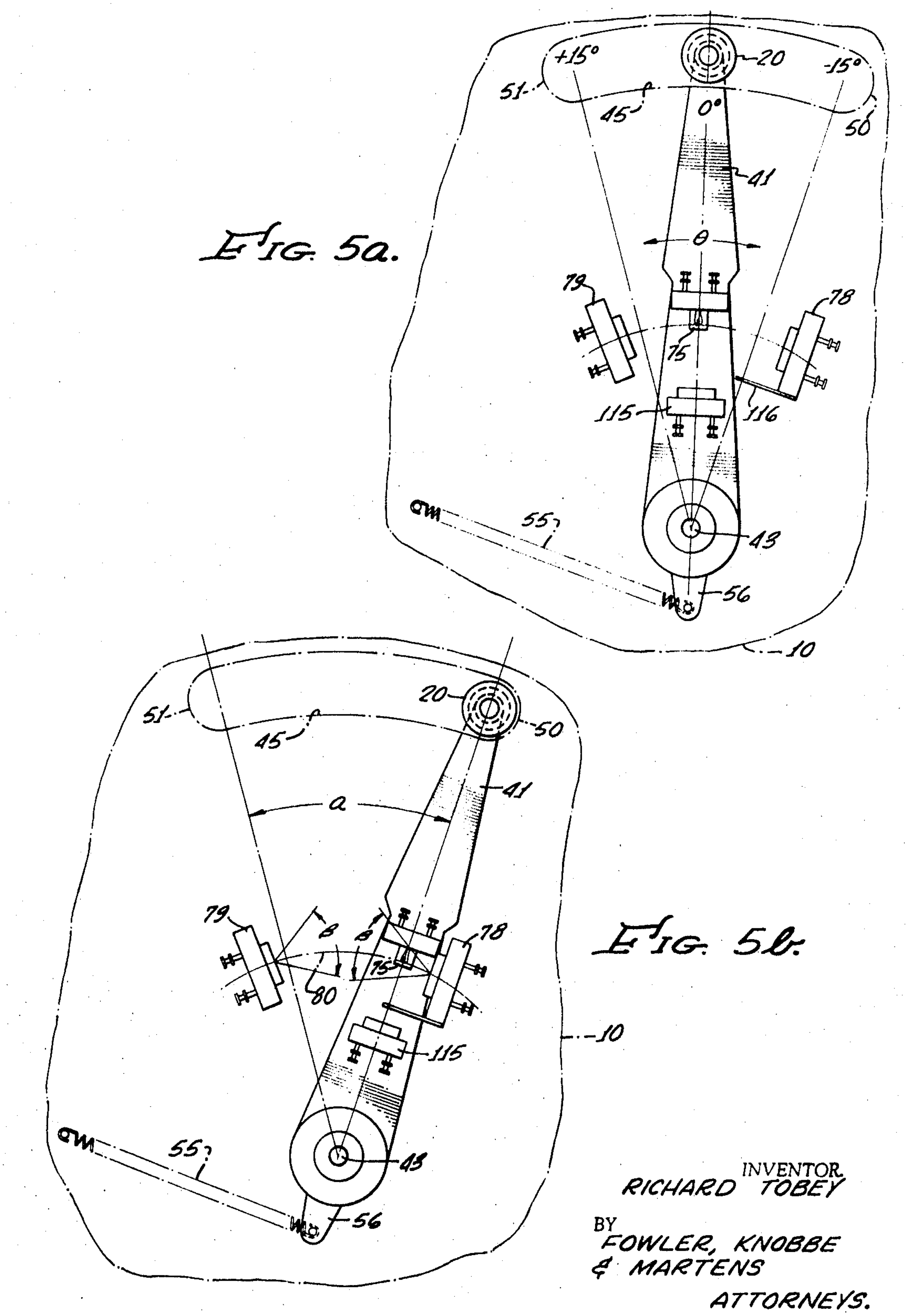

The angular movement of the buffer arm is limited to approximately 20° in the specific embodiment shown. Typically, $\alpha$ will be of the order of 20° to 30°. Advantageously, the outer limit position defined by the arcuate slot is a greater distance from the buffer roller than the inner limit position when the arm is located at its predetermined null position. For example, as seen in FIG. 5*a*, the servo system maintains the arm in a substantially upright position in the embodiment shown, thereby permitting somewhat greater rotational movement of the arm away from the capstan than toward it, i.e. greater storage is provided when the tape is driven toward the arm than when the tape is withdrawn therefrom. This is so because the reel drive motor must supply torque for both taking up the tape and supplying tape tension when tape is driven toward the buffer arm.

In the specific embodiment shown and described herein, the null position constitutes a single position to which the arm is returned following movement of the arm in either direction. In another embodiment (not shown), the arm assumes first a predetermined position closer to the reel when the tape is being withdrawn from the reel and a second predetermined position further from the reel when tape is being fed to the reel. As a result, the latter embodiment provides a somewhat larger buffer tape storage while requiring, however, a more complex servo loop than the one shown in FIG. 6.

The position of buffer arm 41 is detected by means of a light energy source 75 such as a miniature incandescent bulb carried by the buffer arm and light sensitive means fixedly mounted to the recorder housing for providing an electrical characteristic corresponding to the position of the lamp. The small angle of maximum travel of the arm 41 between the outer and inner limits 50, 51 facilitates energization of lamp 75 since direct electrical connection can be made thereto via flexible electrical leads 76, 77. A steady source of illumination is thus insured from lamp 75 while avoiding the cost and potential electrical and mechanical problems of a slip ring connection. Advantageously, the light sensitive means comprises a pair of photosensitive devices 78 and 79 located on opposite sides of the buffer arm. In the preferred embodiment, the light source provides a substantially non-directional source of light in a plane parallel to the tape deck 10 and the photosensitive devices 78 and 79. The latter devices, however, typically are sensitive to light radiation within a predetermined solid angle $\beta$, as shown in FIGS. 5*a* and 5*b*. Best results are obtained by locating the devices so that the arc 80 defined by the travel of the light source 75 lies within the predetermined solid angle of sensitivity of both the devices 78, 79 as the buffer arm is rotated through its predetermined angular distance. Also, the devices are advantageously located substantially equidistant from the light source when the buffer arm is in its predetermined null position, as shown in FIG. 5*b*.

The lamp 75, and photosensors 78, 79 are advantageously provided by miniature, light weight components so as to minimize the movement of inertia with respect to the arm pivot axis. Such components are readily available. Also, the inertia effect is minimized by locating these components physically close to the pivot axis 43 as shown in FIGS. 4 and 5.

In like manner, the position of the buffer arm 40 is monitored by a lamp 81 (FIG. 6) carried by the buffer arm and a pair of photosensitive devices 82 and 83 located on opposite sides of the arm (FIGS. 2 and 6). Lamp 81 is energized by flexible leads 84, 85.

A block diagram of the reel servo system is shown in FIG. 6. The position of the buffer arms 40, 41 and relay contact states shown in this figure are those which exist during normal operation of the recorder in a record/playback or rewind operation. In the embodiment of FIG. 6, the photosensitive devices responsive to the lamp 75 are photoresistors; however, it will be apparent that other embodiments may utilize photodiodes, phototransistors, and other photoelectric, photovoltaic and photoconductive devices. The photoresistors 82 and 83 are advantageously differentially coupled so as to provide an output signal corresponding to the difference between the output electrical characteristics of these devices and independent of any ambient light falling evenly on the sensors 82, 83, or variation in the output of the lamp 81. Thus, as shown, the photoresistors 82 and 83 are connected together in series circuit between opposite polarity sources, typically +6 volts and −6 volts, to provide an output node point 90 at the common connection of the photoresistors. A continuous voltage is produced at node 90 corresponding to the angular position of the light source 81. The magnitude of this voltage corresponds to the angular displacement of the lamp 81 and the polarity of the voltage corresponds to the direction of the displacement thereof.

A representative output signal derived at the node 90 is illustrated in the graph of FIG. 7 in which node voltage is plotted along the ordinate and angular displacement of the buffer arm in degrees along the abscissa. A particular feature of the present invention is that the output voltage is substantially linear for angular displacement proximate the null or predetermined position point, i.e. + or −5° from the null or zero degree point. This voltage at node 90 may be advantageously used as the control signal in both linear and non-linear servo loops; however, its linear characteristic is especially adapted for providing linear servo response and accordingly a linear servo is incorporated in the preferred embodiment described herein.

In the linear servo shown, the output voltage at node 90 is connected through a phase-lead network 95 to the summing junction 96 of a servo amplifier 97. A preselected non-varying current is also supplied to the summing junction 96 by buffer arm adjust potentiometer 98 and series resistor 99. The fixed contacts at respectively opposite ends of the potentiometer resistance winding are connected between the +6 and −6 volt sources and its movable contact is connected via resistor 99 to summing junction 96.

The servo loop is completed by a connection between the output of servo amplifier 97 and file reel motor 60 through control relay contact 100*a*.

The operation of the file reel servo is as follows: The movable contact of the buffer arm adjust potentiometer 98 is adjusted to position the buffer arm 40 at the predetermined null position. In this position, a suitable error signal is produced at the summing junction 96 by virtue of the difference between the voltage at node 90 and movable contact of potentiometer 98 to produce a motor torque in the direction of arrow 105 sufficient to counterbalance the force of spring 57. Acceleration of the tape in the direction of arrow 70 by the capstan drive and consequent movement of the buffer arm toward its inner limit will cause a reduced signal at summing junction 96 and hence a reduced motor torque so that the arm will return to the null position set by potentiometer 98. Deceleration of the tape in the direction of arrow 70 (or acceleration in the opposite direction such as in rewind) will produce movement of the buffer arm 40 toward its outer limit. As a result, an increased signal will be applied to summing junction 96 to supply an increased motor torque in the direction of arrow 105 to return the arm 40 to its predetermined null position.

The specific form of servo drive employed will vary according to the system requirements. Thus, in low mass systems, i.e. in systems wherein the file reel is small and light in weight, e.g. a 3 inch diameter reel of ¼ inch wide magnetic tape, the acceleration forces required are low enough that normal tape tension is more than adequate to accelerate the file reel when the buffer arm 40 swings toward its inner limit (indicating that tape must be unwound from the file reel). Accordingly, it is sufficient to drive the reel motor 60 in only that direction of arrow 105 and obtain servo control by varying the magnitude of torque between values of zero torque when the buffer arm swings to its inner extreme limit and maximum torque when the buffer arms swings to its outer extreme limit. In tape transports using larger reels involving greater amounts of tape with attendant higher inertia, a servo is used which reverses the direction of torque when the buffer arm swings inwardly, thus using motor 60 to unwind as well as wind tape onto the file reel. Specific forms of servo amplifiers and servo motors (utilizing both A.C. and D.C. driven servo motors) for providing each of these systems are well known in the art so as to not require any description herein.

In like manner, the take-up means servo system includes a common mode connection 103 between the position sensor photoresistors 78 and 70 connected to the summing junction 104 of servo amplifier 102 through phase-lead network 106. The output of this amplifier is connected through control relay contact 100*c* to the servo drive motor 61 coupled to the take-up hub. The movable contact of buffer arm adjust potentiometer 107 is connected through resistor 108 to the summing junction the operation of the take-up servo loop is the same as the above-described file reel servo.

A significant advantage of the present invention is that the reel servo systems may be critically damped, i.e. when the arm is moved to either side of the predetermined null position, it is returned precisely to the null position by the servo system and does not overshoot its mark and oscillate back and forth one or more times. This is accomplished by the arm carried lamp and stationary light responsive means which provide a noise free, high gain signal source compatible with the substantial amount of electrical phase advance needed to compensate for the time constant or phase lag in each energy storage element in the servo loop such as the file reel motor 60. Representative phase-lead networks 95 and 106 for critically damping the servo system are shown in FIG. 6 comprising a series connected differentiating capacitor 110 and resistor 111 in parallel with resistor 112. Typical values for these components are .22$\mu$f for capacitor 110 and 1000 ohms for resistor 111 where resistor 113 is substantially larger, e.g. 330K ohms. It will thus be seen that the servo loop gain for the higher frequency signals (corresponding to rate of change of position of the buffer arm) is substantially higher than for the low-frequency, steady state signal (corresponding to position of the buffer arm). Although the ratio of rate of change of position signal ($S_R$) to position signal ($S_p$) will vary in accordance with the specific elements of the servo loop, best results with contemporary digital tape transports require a minimum ratio of 50 to 1 at a frequency of 50 Hz., i.e.

$$S_R:S_p \geqq 50:1$$

to achieve critical damping of the reel servo. Heretofore, the noise inherent in the prior art potentiometer and like transducers used for following the buffer arm position has severely limited the ability to construct a system with this high a value of differentiated loop signal since the differentiated noise could easily swamp the servo loop. As a result, substantially lower ratios have previously been employed, resulting in under damped servo loops.

The tape transport described herein includes improved means for detecting movement of the buffer arm to a predetermined position. For example, when the file reel buffer arm 40 swings to its extreme outer position, its buffer storage capacity is filled so that it cannot accept any additional tape fed from the file reel. If more tape is then fed from the reel, the tape will go slack and possibly become entangled in the transport apparatus. Such occurrence is obviated by providing each of the buffer arms with a sensor means for detecting movement of the buffer arm to a predetermined limit position, typically to within a degree or less of its extreme outer limit position. As shown in FIGS. *5a*, *5b* and 6, light responsive device 115 is carried on the arm 41 to continuously receive light energy from the lamp 75 except when the arm swings to the outer limit position 50, at which occurrence a light shield 116 affixed to the tape deck blocks off the light rays from the lamp 75 to the sensor 115. Likewise, the buffer arm associated with the file reel servo carries a light responsive element 120 which cooperates with the shield 121 attached to the tape deck for detecting movement of buffer arm 40 to its outer position.

The outputs of the limit sensors 115, 120 are ANDed as follows: One lead of each of the limit sensors 115, 120 is connected to a potential source, e.g. the +6 volts as shown. Advantageously, one of these sensors is series connected to a door interlock switch 125. The other leads of each of the limit sensors are connected to respective resistors 130 and 131 to a potential source of opposite polarity, e.g., −6 volts as shown. These leads are also connected to respective inputs of AND gate 132 whose output is connected to relay driver amplifier 133 which in turn is operatively coupled to the relay coil of control relay 134.

The limit sensors 115 and 120, respectively, in combination with the lamps 75 and 81 carried on the buffer arms 41 and 40 enable operation of the control relay in the following manner. So long as both of the photoresistors 115 and 120 receive light input from their associated lamp, both of the inputs of AND gate 132 are positively biased by virtue of the low impedance through these photoresistors. AND gate 132 is then enabled, resulting in actuation of the control relay 134. Should either one of the lamps 75 or 81 be extinguished or should either of the limit shields be imposed between its associated lamp and limit sensor by virtue of movement of the buffer arm to the extreme outer position, one of the inputs of the AND gate will be a negative polarity. The AND gate—then no longer enabled—causes the control relay to de-actuate.

Relay 134 is advantageously used to provide a plurality of control functions. Respective contacts 100*a*, 100*b* and 100*c* of the control relay are normally open, contact 100*a* being connected in series with the file reel servo loop, contact 100*b* being series connected with the brake solenoid 140, and contact 100*c* being series connected with the take-up reel servo loop. Single pole-double throw contacts 100*d* include a normally closed set connected in a shunt with the capstan drive motor 26 and a normally open set connecting the capstan motor to the capstan drive signal source 135.

The brake solenoid 140 is mechanically coupled to a brake arm 141 provided with a pair of brake shoes 142 and 143 which respectively cooperate with a brake hub 144 on the file motor axis and brake hub 145 on take-up reel motor. Brake arm 141 is normally engaged with the brake hubs by tension spring 146. However, upon energization of the brake solenoid 140 by closure of the contacts 100*b* of the control relay, the brake arm is displaced from the brake hub as illustrated in FIG. 6.

Contacts 100*a* and 100*c* are opened when the control relay is de-actuated, thereby removing all power to both the file and take-up motors 60 and 61. The buffer arms 40 and 41 are then respectively biased toward their extreme outer positions by the tension springs 57 and 55 to maintain tape tension (rotation of the file and take-up reel motors being prevented by the brake shoes 142 and 143 which respectively engage the brake hubs 144 and 145 when the relay 134 is de-energized).

The short placed across the leads of the capstan motor 26 by the normally closed set of relay contacts **100*d* when relay 134** is de-energized provides for dynamic braking of the capstan drive if the capstan is rotating when the control relay is de-actuated.

Fail-safe operation of reel servos, buffer arm limit detectors, and tape position sensors 30, 31 is advantageously provided for by electrically connecting the buffer arm lamps 75, 81 in series with the lamps 32 and 35 of the sensors 30, 31 and current source 150. Thus, burnout of any of the lamps 32, 35, 75 or 81 will cause immediate de-actuation of the control relay and resultant halting of the machine operation.

It will therefore be seen that machine operation is automatically halted upon occurrence of any one of the following conditions:

(a) Failure of lamp 75 or 81, thus preventing continued operation of the machine if one or the other of reel servos is disabled by virtue of bulb failure.

(b) Failure of lamp 32 or 35, thus preventing continued operation of the machine if either of the tape position sensors is disabled by virtue of bulb failure.

(c) Swinging of either of the buffer arms to their outer limit position, thus preventing continued operation of the machine if the buffer storage cannot accept additional tape from either the file or take-up means.

(d) Opening of the tape transport door causing the opening of interlock switch 125, thus preventing operation of the machine if the door has not been closed or if the door is opened while the machine is being operated.

ALTERNATIVE EMBODIMENTS

An alternative embodiment of the limit position apparatus is shown in FIG. 8. As in the foregoing described embodiment, the buffer arm 160 includes a light source 161 mounted on the arm juxtaposed a photo responsive device 162 also mounted on the arm. Photosensor 162 advantageously controls the control relay in the same manner as the system described above and illustrated in FIG. 6. A shield 163 is affixed to the rear side of the tape deck on a line connecting the pivot axis 164 of the arm and the end 165 of the arcuate slot 166 located away from the tape reel. This slot interrupts the light path from the lamp to the photoresponsive device when the arm reaches a predetermined limit position away from its associated reel. During normal record/playback and rewind operation, this limit position is not reached by the arm since the reel servo responds to the error signal provided by photosensors 170 and 171 to limit movement of the arm; however, under abnormal conditions, more tape may be fed into the buffer storage than the buffer storage can accommodate. For example, if arm 160 is associated with the file reel and during playback, the motor driving the file reel should for some reason not keep pace with the tape fed from the capstan, the excess tape fed toward buffer storage will cause the arm to assume its extreme position away from the reel. In this condition, termed the "long loop fault," the tape goes slack generally causing tape damage or faulty machine operation. In this embodiment, as in the above-described embodiment, such a condition is detected by the combination of shield 163, lamp 161 and photoresponsive device 162.

Also there may be an abnormal condition termed the "short loop fault." Such a condition is caused, for example, by a drag being placed on the file reel so that the capstan attempts to withdraw more tape from the buffer storage than is being fed into it from the file reel. In this instance, the arm swings to its extreme position nearest the file reel. Such excessive swing of the arm is detected in the embodiment of FIG. 8 by the combination of an additional shield 175 with lamp 161 and photoresponsive means 162 so that movement of the arm to within a degree or so of the end 176 of arcuate slot 166 also causes an interruption of the light to the photocell and orderly shut down of the machine.

Another embodiment of the present invention is illustrated in FIG. 9 in which information corresponding to movement of the arm to a predetermined limit position is obtained from the output of the reel servo loop. As shown, arm 180 carries a lamp 181 which cooperates with a pair of photoresponsive devices 182 and 183 located proximate the path movement of the lamp as in the above-described embodiments. In the circuit shown, these photoresponsive devices are photoresistors differentially connected to provide a variable control voltage at node 184. As in the previous embodiment, the voltage at node 184 supplies a control signal for the reel servo loop which includes phase-lead network 185 and amplifier 186.

In addition, the node voltage is applied to the input of a voltage level detector 190.

In normal operation of the servo loop, the output of the voltage level detector produces a voltage enabling one input 191 of AND gate 192, and energizing control relay 193 via relay drive amplifier 194. However, if the node voltage reaches a predetermined magnitude and polarity, corresponding to arm movement to a predetermined limit position, the detector output drops to a zero or negative voltage, thereby inhibiting AND gate 192 and de-energizing relay 193. For example, referring to FIGS. 5*a* and 7, the voltage level detector will be preset to inhibit the AND gate when the input node voltage reaches a predetermined level between +2.5 and +3 volts for "long loop fault" detection or between −2.5 and −3 volts for "short loop fault" detection.

It will be apparent that a voltage level detector associated with the take-up reel (not shown) will provide a like enabling or inhibit signal to AND gate input 195 so that if either buffer arm is positioned at its predetermined arm limit position, the control relay 193 will open and the machine operation will halt.

Also, both long and short "fault loop" detection may be provided by a pair of voltage level detectors associated with each node point, one responsive to a positive polarity node voltage corresponding to a "long loop" limit and another responsive to a negative polarity node voltage corresponding to a "short loop" limit.

I claim:

1. In a magnetic tape recorder having a buffer tape storage arm rotatably mounted with respect to the recorder tape deck, an improved servo system for maintaining said buffer arm in a predetermined position comprising a lamp carried by said buffer arm so that the movement of said lamp duplicates the movement of said arm, a pair of photoresponsive devices each having an electrical output characteristic corresponding to the input light energy, said devices being located proximate the path of movement of said lamp on respectively opposite sides of said buffer arm, means coupling said devices to provide an output signal corresponding to the difference between the output electrical characteristics of said devices so that said output signal is substantially linearly proportional to the movement of said arm and is substantially independent of ambient light or variation in light output of said lamp, and servo means including a phase-lead network, an amplifier and driven tape reel means responsive to said output signal for varying the force applied to the tape supplied to said buffer tape storage arm, said phase-lead network compensating for the time constants of the energy storage elements included in the servo system so that said servo system is substantially critically damped and said buffer arm—when moved from said predetermined position because of acceleration or deceleration of the tape supplied thereto—returns to said predetermined position without overshoot.

2. In a magnetic tape recorder having a buffer tape storage arm rotatably mounted with respect to the recorder tape deck, a lamp carried by said buffer arm so that the movement of said lamp duplicates the movement of said arm, a photoresponsive device carried by said buffer arm responsive to the light energy supplied by said lamp, said device having an electrical output characteristic which changes in accordance with the input light energy, a light shield affixed to said tape deck for blocking off the light energy from said lamp to said photoresponsive device when said arm swings to a predetermined position, and means coupled to said photoresponsive device responsive to the change in its electrical output characteristic when said light shield blocks off the light energy for halting operation of said tape recorder when (i) said arm reaches said predetermined position or (ii) when said lamp is extinguished.

3. In a magnetic tape recorder having a buffer tape storage arm rotatably mounted with respect to the recorder tape deck, an improved system for maintaining said buffer arm in a predetermined position comprising a lamp carried by said buffer arm so that the movement of said lamp duplicates the movement of said arm, first and second photoresponsive devices each having electrical output characteristics corresponding to the input light energy, said devices being located proximate the path of movement of said lamp on respective opposite sides of said buffer arm, a third photoresponsive device carried by said buffer arm responsive to the light energy supplied by said lamp, said device having an electrical output characteristic which changes in accordance with the input light energy, a light shield affixed to said tape deck for blocking off the light energy from said lamp to said photoresponsive device when said arm swings to a predetermined position, means coupling said first and second photoresponsive devices to provide an output signal corresponding to the difference between the output electrical characteristics of said devices so that said output signal is substantially linearly proportional to the movement of said arm and is substantially independent of ambient light or variation of light output of said lamp, servo means including a phase-lead network, an amplifier and driven tape reel means responsive to said output signal for varying the force applied to the tape supplied to said tape storage arm, means coupled to said third photoresponsive device responsive to the change in its electrical output characteristic when said light shield blocks off the light energy, said means being operatively coupled to disable said servo means when said arm reaches said predetermined position.

4. In a magnetic tape recorder having a buffer tape storage arm rotatably mounted with respect to the recorder tape deck, a first lamp carried by said buffer arm so that the movement of said lamp duplicates the movement of said arm, first photoresponsive means responsive to said lamp for producing a continuous output electrical signal corresponding to position of said buffer arm, second photoresponsive means responsive to said lamp for producing an output electrical characteristic which changes when said lamp reaches a predetermined position, tape position sensing means including a second lamp located proximate the magnetic tape and third photoresponsive means for receiving the light energy from said second lamp which is reflected off a reflective tab affixed to the magnetic tape, means connection said first and second lamps in series, servo means responsive to the output signal of said first photoresponsive means for varying the force applied to the tape which is supplied to said buffer tape storage arm, and means coupled to said second photoresponsive means for halting operation of said tape recorder when (i) said arm reaches said predetermined position or (ii) when either said first or second lamp is burnt out.

5. In a magnetic tape recorder having a buffer tape storage means movably mounted with respect to the recorder tape deck, an improved servo system for maintaining said buffer tape storage means in a predetermined position comprising a source of light energy whose spatial position varies in accordance with movement of said buffer tape storage means, a pair of photoresponsive devices located proximate the path of movement of said light energy source on respectively opposite sides of said buffer tape storage means, means coupling said photoresponsive devices to provide an output signal corresponding to the difference between the output electrical characteristics of said devices, and servo means responsive to said output signal for varying the force applied to the tape which is supplied to said buffer tape storage means.

6. The magnetic tape recorder as described in claim 5 wherein said source of light energy is substantially non-directional.

7. The magnetic tape recorder as described in claim 5 wherein said source of light energy is a miniature incandescent bulb.

8. The magnetic tape recorder as described in claim 5 wherein each of said photoresponsive devices is sensitive to light radiation within a predetermined solid angle, said devices being located so that the path defined by the travel of said light source lies within the predetermined solid angle of sensitivity of both of said devices.

9. The magnetic tape recorder as described in claim 5 wherein said photoresponsive devices are located substantially equidistant from said light source when said buffer means is in said predetermined position.

10. The magnetic tape recorder as described in claim 5 wherein each of said photoresponsive devices comprises a photoresistor.

11. The magnetic tape recorder as described in claim 5 wherein each of said photoresponsive devices comprises a photo diode.

12. The magnetic tap recorder as described in claim 5 wherein each of said photoresponsive devices comprises a phototransistor.

13. The magnetic tape recorder as described in claim 5 wherein said photoresponsive devices produce a substantially noise free output signal.

14. The magnetic tape recorder as described in claim 5 wherein said photoresponsive devices comprise a pair of photoresistors connected in series circuit between opposite polarity sources and provide an output node at the common connection between said photoresistors, a voltage being produced at said output node having a magnitude corresponding to the angular displacement from said predetermined position and a polarity corresponding to the direction of said displacement.

15. The magnetic tape recorder as described in claim 14 wherein said output voltage is substantially linearly proportional to displacement of said buffer means proximate said predetermined position.

16. A magnetic tape recorder as described in claim 5 wherein said servo means includes a phase-lead network to substantially compensate for the time constants of the energy storage elements included in the servo system so that said serve system is critically damped and said buffer tape storage means is positioned at said predetermined position without overshoot.

17. A magnetic tape recorder as described in claim 16 wherein said phase-lead network provides a rate of change of position signal $S_R$, and a position signal $S_P$ whose ratio is defined by the expression $$S_R:S_P \geqq 50:1$$

18. A magnetic tape recorder as described in claim 5 wherein said servo means includes an electrical differentiator circuit, the output signal produced by the combination of said photoresponsive devices being characterized by an extremely low noise level enabling a high magnitude of rate of change signal to be provided by said differentiator circuit for critically damping said servo system so that said buffer storage means is positioned at said predetermined position without overshoot.

19. A magnetic tape recorder as described in claim 5 wherein said buffer tape storage means comprises a buffer arm rotatably mounted with respect to the recorder tape deck and limited in movement to an acute angle, and flexible leads having one portion affixed to the recorder tape deck and another portion affixed to said buffer arm for supplying electrical power to said source of light energy.

20. A magnetic tape recorder as described in claim 5 comprising means for providing a signal corresponding to movement of said buffer tape storage means to a predetermined position, said means including another photoresponsive device, means for modifying the light path between said source of light energy and said photoresponsive device when said buffer means is moved to said predetermined position.

21. A magnetic tape recorder as described in claim 5 comprising means for providing a signal corresponding to movement of said buffer tape storage means to a predetermined position, said means including another photoresponsive device located for receiving light energy from said source of light energy except when said buffer storage means moves to said predetermined position.

22. A magnetic tape recorder as described in claim 21 comprising means responsively coupled to said additional photoresponsive means and operatively coupled to said servo means for inhibiting operation of said servo system when either (i) said buffer storage means moves to said predetermined position or (ii) said source of light energy is extinguished.

23. A magnetic tape recorder as described in claim 22 comprising tape position sensing means including a second source of light energy and still another photoresponsive means located proximate the magnetic tape, said latter photoresponsive means adapted to receive the light energy from said second source of light energy which is reflected off a reflective tab affixed to the magnetic tape, means connecting the second source of light energy to said source of light energy associated with said buffer tape storage means so that if one of said sources burns out, the other is also extinguished, whereby the operation of said servo system is inhibited when either of said sources burns out.

24. In a magnetic tape recorder, a housing including a recorder tape deck, a magnetic tape reel rotatably mounted to the front side of said tape deck, a buffer storage arm having one end rotatably mounted on a pivot axis to the rear side of said tape deck and having a tape receiving portion at the other end extending through a slot in said tape deck to the front side thereof, said slot limiting movement of said arm to an acute angle, spring means for maintaining tension of said tape, said means coupled to said buffer arm so that its tape receiving portion is biased away from said reel, a lamp mounted on said buffer arm, a photo responsive device mounted on said buffer arm longitudinally juxtaposed said lamp, a shield affixed to the rear of said tape deck on a line connecting the pivot axis of said arm and the end of said slot located away from said reel, said shield spaced from said pivot axis a distance between said lamp and said photoresponsive device so that said shield interrupts the light from said lamp to said photo responsive device when said arm swings on said pivot axis to a predetermined position away from said reel.

25. In a magnetic tape recorder, a housing including a recorder tape deck, a magnetic tape reel rotatably mounted to the front side of said tape deck and driven by a reel motor mounted to the rear side of said tape deck, a buffer storage arm having one end rotatably mounted on a pivot axis to the rear side of said tape deck and having a tape receiving portion at the other end extending through a slot in said tape deck to the front side thereof, said slot limiting movement of said arm to an acute angle, spring means for maintaining tension of said tape, said means coupled to said buffer arm so that its tape receiving portion is biased away from said reel, a lamp mounted on said buffer arm, first and second photoresponsive devices each having electrical output characteristics corresponding to the input light energy, said devices being fixedly located on the rear side of said tape deck proximate the path of movement of said lamp on respectively opposite sides of said buffer arm, means coupling said photoresponsive devices to provide an output signal corresponding to the difference between the output electrical characteristics of said devices, and servo means responsive to said output signal for driving said reel motor.

26. In a magnetic tape recorder having a filing reel, a take up reel and a buffer tape storage arm associated with each of said reels, a lamp carried by each of said buffer arms, a first photoresponsive device associated with the file reel buffer arm and a second photoresponsive device associated with the take up reel buffer arm, each of said photoresponsive devices located to receive light energy from the respective lamps carried by said buffer arms except when their associated storage arm goes to a predetermined position, means responsive to said first and second photoresponsive devices for halting operation of said tape recorder when either of said photoresponsive devices fails to receive light energy.

27. A magnetic tape recorder as described in claim 26 wherein each of said photoresponsive devices comprises a photoresistor, means connecting each of said photoresistors to responsive inputs of a gate so that said gate is enabled when both of said photoresistors receive light energy from the lamp carried on their respective buffer arms, and means responsively coupled to said gate for halting operation of said tape recorder whenever said gate is not enabled.

28. In a magnetic tape recorder having a buffer tape storage means movably mounted with respect to the recorder tape deck, an improved servo system for maintaining said buffer tape storage means in a predetermined position comprising a source of radiant energy whose spatial position varies in accordance with movement of said buffer tape storage means, photoresponsive means located proximate the path of movement of said radiant energy source, means coupled to said photoresponsive means for providing an output signal corresponding to position of said buffer storage means, and servo means responsive to said output signal for varying the force applied to the tape which is supplied to said buffer tape storage means.

29. In a magnetic tape recorder having a buffer tape storage means movably mounted with respect to the recorder tape deck, a source of radiant energy whose spatial position varies in accordance with movement of said buffer tape storage means, photoresponsive means located proximate the path of movement of said radiant energy source and responsive to the radiation of said energy source, said means having an electrical output characteristic which changes in accordance with the input energy including a first value when said buffer tape storage means is capable of accepting or discharging tape and a second value when the capacity of said tape storage means is substantially filled, and means responsively coupled to said photoresponsive means for (i) varying the force applied to the tape which is supplied to said buffer tape storage means and (ii) providing a control signal when said tape storage means is substantially filled.

30. In a magnetic tape recorder having a buffer tape storage means movably mounted with respect to the recorder tape deck, a source of radiant energy whose spatial position varies in accordance with movement of said buffer tape storage means, photoresponsive means responsive to said radial energy source, and means for substantially interrupting the light path between said source of radiant energy and said photoresponsive means when said buffer tape storage means is moved to a predetermined position.

31. In a magnetic tape recorder having a buffer tape storage means movably mounted with respect to the recorder tape deck, an improved servo system for maintaining said buffer tape storage means in a predetermined position comprising a source of radiant energy whose spatial position varies in accordance with movement of said buffer tape storage means, a pair of photoresponsive devices located proximate the path of movement of said light energy source on respectively opposite sides of said buffer tape storage means, means coupling said photoresponsive devices to provide an output signal corresponding to the difference between the output electrical characteristics of said devices, servo means responsive to said output signal for varying the force applied to the tape which is supplied to said buffer tape storage means, and amplitude detector means responsive to said output signal for providing a control signal when said output signal reaches a predetermined value, said control signal corresponding to movement of said buffer tape storage means to a predetermined limit position.

32. In a magnetic tape recorder having a buffer tape storage arm rotatably mounted with respect to the recorder tape deck, a lamp carried by said buffer arm so that the movement of said lamp duplicates the movement of said arm, a tape reel associated with said buffer arm for supplying tape thereto and withdrawing tape therefrom, a photoresponsive device carried by said buffer arm responsive to the light energy supplied by said lamp, said device having an electrical output characteristic which changes in accordance with the input light energy, a first light shield affixed to said tape deck on the side of said arm away from said tape reel for blocking off the light energy from said lamp to said photoresponsive device when said arm swings to a predetermined position away from said arm indicating that more tape is being supplied to said arm that can be taken up on said reel, a second light shield affixed to said tape deck on the side of said arm nearest said reel for blocking off the light energy from said lamp to said photoresponsive device when said arm swings to a predetermined position toward the tape reel indicative that more tape is being withdrawn by the tape reel than is being supplied to the arm, and means coupled to said photoresponsive device responsive to the change in its electrical output characteristic when either said first or said second light shield blocks off the light energy thereto.

References Cited

UNITED STATES PATENTS

| | | | |
|---|---|---|---|
| 2,985,764 | 5/1961 | Von Koenig | 250—219 |
| 3,109,604 | 11/1963 | Brenner | 242—55.14 |
| 3,117,741 | 1/1964 | Chase et al. | 242—75.42 |
| 3,162,789 | 12/1964 | Schlaich | 250—231 X |
| 3,251,048 | 5/1966 | Killen | 340—174.1 |
| 3,384,281 | 5/1968 | Mason | 226—44 X |

WALTER STOLWEIN, Primary Examiner

U.S. Cl. X.R.

179—100.2; 226—44; 242—75.52